US006221966B1

(12) United States Patent
Nakanishi et al.

(10) Patent No.: US 6,221,966 B1
(45) Date of Patent: Apr. 24, 2001

(54) VINYL CHLORIDE RESIN COMPOSITION

(75) Inventors: Yasushi Nakanishi, Akashi (JP); Mamoru Kadokura, Kraainem; Karin Janssen, Diest, both of (BE); Akira Takaki, Kobe; Yasuhiro Miki, Himeji, both of (JP)

(73) Assignees: Kaneka Corporation, Osaka (JP); Kaneka Belgium N.V., Westerlo-Oevel (BE)

( * ) Notice: Subject to any disclaimer, the term of this patent is extended or adjusted under 35 U.S.C. 154(b) by 0 days.

(21) Appl. No.: 09/203,334

(22) Filed: Dec. 2, 1998

(30) Foreign Application Priority Data

Dec. 4, 1997 (JP) ..................................................... 9-334316

(51) Int. Cl.$^7$ ............................ C08L 27/00; C08F 220/10
(52) U.S. Cl. ........................ 525/228; 525/227; 525/309; 526/329.4
(58) Field of Search .................................. 525/227, 228, 525/309; 526/329.4

(56) References Cited

U.S. PATENT DOCUMENTS

| 3,833,686 | 9/1974 | Grochowski et al. . |
| 4,052,482 | 10/1977 | Ide et al. . |

FOREIGN PATENT DOCUMENTS

| 975890 | 10/1975 | (CA) . |
| 0 013 141 | 12/1979 | (EP) . |
| 0 335 365 | 10/1989 | (EP) . |
| 1 378 434 | 12/1974 | (GB) . |

*Primary Examiner*—Christopher Henderson
(74) *Attorney, Agent, or Firm*—Armstrong, Westerman, Hattori, McLeland & Naughton LLP

(57) ABSTRACT

A vinyl chloride resin composition having a greatly improved processability without lowering the transparency wherein the gelation property of a vinyl chloride resin is improved with greatly decreased generation of ungelled substance; which comprises a vinyl chloride resin and 0.1 to 30 parts by weight of a processing aid per 100 parts by weight of said vinyl chloride resin, wherein said processing aid is a polymer prepared by polymerizing (B) 70 to 97 parts by weight of a monomer mixture comprising 60 to 100% by weight of methyl methacrylate, 0 to 40% by weight of at least one monomer selected from the group consisting of an alkyl acrylate and an alkyl methacrylate different from methyl methacrylate and 0 to 10% by weight of other vinyl monomer copolymerizable therewith, in the presence of a latex prepared by emulsion-polymerizing (A) 3 to 30 parts by weight of a monomer mixture comprising 0 to 50% by weight of methyl methacrylate, 50 to 100% by weight of an alkyl acrylate and 0 to 20% by weight of other vinyl monomer copolymerizable therewith, the total amount of said mixtures (A) and (B) being 100 parts by weight, and said polymer has a specific viscosity of at least 1 measured at 30° C. with respect to a solution of 0.4 g of said polymer in 100 ml of benzene.

8 Claims, No Drawings

VINYL CHLORIDE RESIN COMPOSITION

BACKGROUND OF THE INVENTION

The present invention relates to a vinyl chloride resin composition having an excellent processability and being capable of giving a molded articles excellent in physical properties, and more particularly to a vinyl chloride resin composition containing as a processing aid a polymer composed mainly of methyl methacrylate and other alkyl methacrylate or an alkyl acrylate.

Polyvinyl chloride is widely used in various fields because it provides molded articles excellent in physical and chemical properties. However, polyvinyl chloride has various problems in processing, for example, the temperature range adoptable to the molding is relatively narrow because the processing temperature is close to the thermal decomposition temperature and, moreover, it takes long time to become in a molten state.

At present, many techniques to overcome the above-mentioned problems in processing are known. Representative techniques thereof are, for example, addition of a plasticizer to polyvinyl chloride homopolymer, use of a vinyl chloride resin wherein vinyl chloride is copolymerized with other monomers, and mixing of polyvinyl chloride homopolymer with other resin components.

However, by any of these techniques the processability could not be improved sufficiently with keeping excellent physical and chemical properties inherent to polyvinyl chloride. For example, when a plasticizer is added to polyvinyl chloride or when a vinyl chloride resin wherein vinyl chloride is copolymerized with other monomers is used, physical properties of molded articles prepared therefrom are remarkably altered. Main purpose of mixing polyvinyl chloride with other resin components is to reduce the melt viscosity in molding processing to thereby lower the processing temperature. This manner can improve the fluidity of polyvinyl chloride in the appearance, however, in practice the gelation of polyvinyl chloride occurs insufficiently because the kneading energy is consumed by the fluidizing. Thus, the product is inferior in physical properties to a sufficiently gelled polyvinyl chloride even though its appearance is transparent.

In order to solve the problems as mentioned above, JP-B-40-5311 proposes to incorporate as a processing aid a copolymer comprising methyl methacrylate as a main component, which has a relatively high molecular weight, into polyvinyl chloride. However, the added processing aid is apt to remain as an ungelled substance (generally called "fish eyes") in the product and, therefore, the appearance of the product is easy to be impaired. Furthermore, there is a problem that further effects desired to be produced by adding a processing aid such as improvement of gloss of product, improvement of secondary processability and decrease in specific gravity of molded foam, are not sufficiently exerted.

JP-B-52-49020 and JP-B-53-2898 propose to incorporate as a processing aid a two-stage polymer which is prepared by polymerizing a major amount of an acrylic acid ester or a methacrylic acid ester other than methyl methacrylate in the presence of a latex of polymethyl methacrylate or a copolymer containing a major amount of methyl methacrylate. This proposal has a certain effect on preventing generation of an ungelled substance. However, the proposed processing aid is not still satisfactory, because when the processing aid is added to a vinyl chloride resin, there often occur phenomena which are assumed to result from insufficient dispersion of the processing aid into the vinyl chloride resin, e.g., deterioration of transparency of a molded article, decrease in degree of gelation, deterioration of secondary processability such as elongation at high temperatures and the like.

In the case of using a processing aid having a very high molecular weight, it is easily expected that the effect of giving a viscosity and an elasticity to a vinyl chloride resin becomes higher. However, it is also well known that, in the case of using a processing aid the molecular weight of which is simply increased, the above-mentioned phenomena due to poor dispersibility occur remarkably.

In order to eliminate the problems, such as the generation of an ungelled substance and the deterioration of transparency, which are encountered in such a high molecular weight region, Japanese Patent No. 2,515,014 proposes to adjust the particle size of a latex of a two-stage polymer to at most 1,000 Å, wherein the latex is prepared by polymerizing a component containing a major amount of methyl methacrylate and subsequently adding and polymerizing a component containing a major amount of an alkyl acrylate.

French Patent No. 2,180,595 discloses a technique wherein a component having a relatively low glass transition temperature which mainly comprises an acrylic acid ester is used as a core for the two-stage polymerization. The object of this technique is to prevent a vinyl chloride resin from adhering to a metal surface at processing, to suppress an increase in viscosity of a vinyl chloride resin and to suppress revelation of an elasticity of a melted resin represented by Barus effect, by the use of a processing aid having a relatively low molecular weight. However, this is based on a different concept from that of other conventional techniques and, resultingly, such a technique cannot produce any effect as obtained by the present invention such as improvement of processability.

As described above, generation of an ungelled substance resulting from a processing aid incorporated into a vinyl chloride resin is undesirable, because of not only exhibiting no effect of the processing aid, but also deteriorating the transparency that the vinyl chloride resin originally possesses and impairing excellent physical and chemical properties thereof. If the problem of poor dispersibility represented by the generation of an ungelled substance is solved, it is possible to give a higher effect of a processing aid by using the processing aid in the same amount as in a conventional one and to decrease the amount of the processing aid for giving the same degree of effect as that achieved by a conventional one. Additionally, it is possible to prevent deterioration of physical properties which results from increasing the molecular weight of a processing aid and, therefore, it is possible to expect a processing aid which can be used in an improved high efficiency.

It is an object of the present invention to provide a vinyl chloride resin composition having an excellent processability and being capable of giving a molded article excellent in physical properties.

A further object of the invention is to provide a processing aid which can improve the gelation property of a vinyl chloride resin by the use in a smaller amount and, resultingly, which suppresses remarkably the generation of an ungelled substance and which remarkably improves the processability without deteriorating the transparency.

These and other objects of the present invention will become apparent from the description hereinafter.

SUMMARY OF THE INVENTION

It has now been found that when using, as a processing aid for vinyl chloride resins, a polymer having a relatively high molecular weight which is prepared by polymerizing a monomer mixture mainly comprising methyl methacrylate in the presence of a latex of a copolymer prepared by emulsion-polymerizing a monomer mixture mainly comprising an alkyl acrylate, the component containing a major amount of an alkyl acrylate in inner layer enhances the dispersion of the component containing a major amount of methyl methacrylate in the outer layer which is a similar component to that of a conventional processing aid for vinyl chloride resin and, consequently, it is possible to notably exert effects expectable from adding a processing aid by the use of a small amount, such as promotion of gelation, improvement of secondary processability, decrease in specific gravity of molded foams and enhancement of molded article gloss, without impairing excellent physical and chemical properties that vinyl chloride resins inherently possess.

In accordance with the present invention, there is provided a vinyl chloride resin composition comprising a vinyl chloride resin and 0.1 to 30 parts by weight of a processing aid per 100 parts by weight of said vinyl chloride resin, wherein said processing aid is a polymer prepared by polymerizing (B) 70 to 97 parts by weight of a monomer mixture comprising 60 to 100% by weight of methyl methacrylate, 0 to 40% by weight of at least one monomer selected from the group consisting of an alkyl acrylate and an alkyl methacrylate different from methyl methacrylate and 0 to 10% by weight of other vinyl monomer copolymerizable therewith, in the presence of a latex prepared by emulsion-polymerizing (A) 3 to 30 parts by weight of a monomer mixture comprising 0 to 50% by weight of methyl methacrylate, 50 to 100% by weight of an alkyl acrylate and 0 to 20% by weight of other vinyl monomer copolymerizable therewith, the total amount of said mixtures (A) and (B) being 100 parts by weight, and said polymer has a specific viscosity of at least 1 measured at 30° C. with respect to a solution of 0.4 g of said polymer in 100 ml of benzene.

In a preferable embodiment of the present invention, said polymer used as the processing aid has an average particle size of at most 1,000 Å in the form of an aqueous latex.

The vinyl chloride resin composition of the present invention has excellent transparency and processability with an excellent gelation property.

DETAILED DESCRIPTION

The feature of the present invention is to use, as a processing aid for vinyl chloride resins, a polymer which is prepared by emulsion-polymerizing a monomer mixture containing a major amount of an alkyl acrylate to give a latex of copolymer and subsequently adding and polymerizing a monomer mixture containing a major amount of methyl methacrylate, instead of a conventionally used processing aid which is a two-stage polymer obtained by emulsion-polymerizing a monomer mixture containing a major amount of methyl methacrylate to give a first-stage copolymer component, and subsequently adding and polymerizing a second-stage monomer mixture containing a major amount of an alkyl acrylate. As stated above, the inner layer of an alkyl acrylate-based polymer serves to enhance dispersion of the outer layer of a methyl methacrylate-based polymer into vinyl chloride resins.

The vinyl chloride resin composition of the present invention comprises 100 parts by weight of a vinyl chloride resin and 0.1 to 30 parts by weight of the processing aid as mentioned above.

The vinyl chloride resin used in the present invention includes vinyl chloride homopolymer and copolymers comprising 80 to 100% by weight of units derived from vinyl chloride and 0 to 20% by weight of units derived from other monomers copolymerizable with vinyl chloride.

Examples of the other monomers copolymerizable with vinyl chloride are, for example, vinyl acetate, propylene, styrene, an acrylic acid ester, e.g., an alkyl acrylate having a $C_1$ to $C_8$ alkyl group such as methyl acrylate, ethyl acrylate, butyl acrylate or 2-ethylhexyl acrylate, and the like. These may be used alone or in admixture thereof.

The vinyl chloride resin is not particularly limited, for example, in an average polymerization degree, and conventionally used vinyl chloride resins can be used therefor.

Examples of the vinyl chloride resin are, for example, polyvinyl chloride homopolymer, a copolymer of at least 80% by weight of vinyl chloride monomer and other monomers copolymerizable with vinyl chloride such as vinyl acetate, propylene, styrene and an acrylic acid ester, post-chlorinated polyvinyl chloride and the like. These may be used alone or in admixture thereof.

In the present invention, as the processing aid for vinyl chloride resins is used a polymer prepared by emulsion-polymerizing the monomer mixture (A) to give an aqueous latex and subsequently polymerizing the monomer mixture (B). The processing aid imparts excellent properties such as gelation property and processability to the vinyl chloride resins without deteriorating excellent properties such as a transparency of the vinyl chloride resins.

The monomer mixture (A) comprises 0 to 50% by weight of methyl methacrylate, 50 to 100% by weight of an alkyl acrylate and 0 to 20% by weight of other vinyl monomer copolymerizable therewith.

The other copolymerizable vinyl monomer optionally used is selected according to the purposes of the resulting vinyl chloride resin composition.

By disposing a copolymer prepared from the monomer mixture (A) in the inner layer of the processing aid polymer, it is possible to promote gelation of a vinyl chloride resin and to prevent generation of an ungelled substance in the composition. Resultingly, a viscosity and an elasticity can be given to the vinyl chloride resin more efficiently.

Examples of the alkyl acrylate used in the monomer mixture (A) are, for example, alkyl acrylates having a $C_1$ to $C_8$ alkyl group, such as methyl acrylate, ethyl acrylate, butyl acrylate and 2-ethylhexyl acrylate, and the like. These may be used alone or in admixture thereof. Butyl acrylate is preferable from the viewpoint of giving a polymer having a low glass transition temperature.

Examples of the other copolymerizable vinyl monomer used in the monomer mixture (A) are, for example, an aromatic vinyl compound such as styrene or α-methylstyrene, an unsaturated nitrile compound such as acrylonitrile, and the like. These may be used alone or in admixture thereof.

The contents of the respective components in the monomer mixture (A) are 0 to 50% by weight, preferably 20 to 50% by weight, more preferably 30 to 45% by weight of methyl methacrylate, 50 to 100% by weight, preferably 50 to 80% by weight, more preferably 55 to 70% by weight of an alkyl acrylate, and 0 to 20% by weight, preferably 0 to 10% by weight, more preferably 0 to 5% by weight of a vinyl monomer copolymerizable therewith. If the content of methyl methacrylate in the monomer mixture (A) is more than 50% by weight, or if the content of the alkyl acrylate in the monomer mixture (A) is less than 50% by weight, favorable gelation property deteriorates and an ungelled substance is generated. Additionally, it is preferable not to use the other copolymerizable vinyl monomer from the viewpoint of obtaining an excellent gelation property which is a feature of the present invention, however, if required, it can be used in an amount of at most 20% by weight.

The monomer mixture (B) comprises 60 to 100% by weight of methyl methacrylate, 0 to 40% by weight of at least one monomer selected from the group consisting of an alkyl acrylate and an alkyl methacrylate different from methyl methacrylate, and 0 to 10% by weight of other vinyl monomer copolymerizable therewith. The monomer mixture (B) has the same effect as a component used in a conventional processing aid for vinyl chloride resins to improve gelation property and processability.

The other copolymerizable vinyl monomer is used, as occasion demands, according to the purposes of the resulting vinyl chloride resin composition.

Examples of the alkyl acrylate are, for example, methyl acrylate, ethyl acrylate, butyl acrylate, 2-ethylhexyl acrylate and the like. Examples of the alkyl methacrylate different from methyl methacrylate are, for example, ethyl methacrylate, butyl methacrylate, 2-ethylhexyl methacrylate and the like. Each of these alkyl acrylate and alkyl methacrylate different from methyl methacrylate may be used alone or in admixture thereof.

Examples of the other copolymerizable vinyl monomer are, for example, an aromatic vinyl compound such as styrene or α-methylstyrene, an unsaturated nitrile compound such as acrylonitrile, and the like. These may be used alone or in admixture thereof.

The contents of the respective components in the monomer mixture (B) are 60 to 100% by weight, preferably 60 to 90% by weight, more preferably 65 to 85% by weight of methyl methacrylate, 0 to 40% by weight, preferably 0 to 30% by weight, more preferably 0 to 20% by weight of at least one monomer selected from an alkyl acrylate and an alkyl methacrylate different from methyl methacrylate, and 0 to 10% by weight, preferably 0 to 5% by weight, more preferably 0 to 3% by weight of a vinyl monomer copolymerizable therewith.

If the content of methyl methacrylate in the monomer mixture (B) is less than 60% by weight, the transparency and processability of the obtained composition deteriorate. If the content of at least one monomer selected from an alkyl acrylate and an alkyl methacrylate different from methyl methacrylate is more than 40% by weight, the transparency and processability also deteriorate. If the content of the other copolymerizable vinyl monomer is more than 10% by weight, the gelation property and transparency deteriorate.

The amount of the polymer component prepared from the monomer mixture (A) in 100 parts by weight of the processing aid is from 3 to 30 parts by weight, preferably 5 to 20 parts by weight, more preferably 8 to 15 parts by weight. This component can notably improve the gelation property and processability as a result of the presence in an amount as small as 3 to 30 parts by weight in the inner layer of the polymer, thus the effect brought by adding a processing aid can be exhibited in a high efficiency. Hitherto it has never been known that such a minor component has a peculiar effect. If the amount of the polymer component prepared from the monomer mixture (A) is more than 30 parts by weight, the gelation property and transparency of a vinyl chloride resin deteriorate. If the amount is less than 3 parts by weight, the dispersibility of the processing aid into a vinyl chloride resin deteriorates and an ungelled substance tends to be generated.

The amount of the polymer component prepared from the monomer mixture (B) is from 70 to 97 parts by weight based on 100 parts by weight of the processing aid, preferably 80 to 95 parts by weight, more preferably 85 to 92 parts by weight. If the amount of the polymer component prepared from the monomer mixture (B) is more than 97 parts by weight, the dispersibility of the processing aid into a vinyl chloride resin deteriorates and an ungelled substance tends to be generated. If the amount is less than 70 parts by weight, sufficient improvement of the gelation property which is an object of the present invention is not achieved.

The polymer used as the processing aid can be prepared, for example, in the following manner.

The monomer mixture (A) is first emulsion-polymerized in the presence of a suitable medium, an emulsifier, a polymerization initiator, a chain transfer agent and the like to give a latex of a polymer of the monomer mixture (A). Then, to the latex of the polymer of the monomer mixture (A), the monomer mixture (B) is added to polymerize monomer. By such a stepwise polymerization of the respective mixtures, there is obtained a polymer wherein the polymer of the monomer mixture (A) forms an inner layer and the polymer of the monomer mixture (B) forms an outer layer disposed on the inner layer.

The suitable medium used in the above-mentioned emulsion-polymerization is usually water.

The emulsifier is not particularly limited and known emulsifiers can be used. Examples of the emulsifier are, for example, an anionic surfactant such as a fatty acid salt, an alkylsulfuric acid ester salt, an alkylbenzenesulfonic acid salt, an alkylphosphoric acid ester salt or a sulfosuccinic acid diester salt, a non-ionic surfactant such as a polyoxyethylene alkyl ether or a polyoxyethylene fatty acid ester, and the like.

As the polymerization initiator, there can be used a water-soluble or oil-soluble polymerization initiator, a thermally decomposable initiator, a redox initiator and the like. For example, conventional initiators, e.g., an inorganic initiator such as a persulfate, an organic peroxide, an azo compound or the like may be used alone, or may be used as a redox initiator in combination with a sulfite, a hydrogensulfite, a thiosulfate, a primary salt, formaldehyde sodium sulfoxylate or the like. Examples of the persulfate preferred as the polymerization initiator are, for example, sodium persulfate, potassium persulfate, ammonium persulfate and the like. Examples of the preferable organic peroxide are, for example, t-butyl hydroperoxide, cumene hydroperoxide, benzoyl peroxide, lauroyl peroxide and the like.

The polymerization temperature and time are not particularly limited and may be selected suitably so as to obtain desired specific viscosity and particle size in view of the purposes of the obtained vinyl chloride resin composition.

In the latex of the polymer used as the processing aid prepared in the above manner, it is preferable that the average particle size is from 100 to 3,000 Å, more especially from 100 to 1,000 Å. When the average particle size is not more than 1,000 Å, there is a tendency that a vinyl chloride resin incorporated therewith can be molded even under a severe processing condition. It is difficult to obtain a latex having an average particle size of less than 100 Å. If the average particle size is more than 3,000 Å, the dispersibility is lowered.

A conventional processing aid had poor dispersibility and it was necessary to select a processing condition. In contrast, the processing aid according to the present invention has an excellent dispersibility and a vinyl chloride resin incorporated therewith has an improved processability under conventionally adopted processing conditions such as roll temperature, kinds of additives such as stabilizer and lubricant, and the like (for example, under conditions such that a usual tin-containing compound is processed by an 8-inch test roll at a roll temperature of 1600 to 180° C.). However, there is a case that the dispersibility is lowered and the gelation is hard to promote, resulting in deterioration of transparency and processability, under some processing conditions, for example, when the roll temperature is lower than the conventional (e.g., 140° to 160° C.) or when a lubricant is added too much. In such a case, the problems can be solved by adjusting the average particle size of the latex of the polymer used as the processing aid to a size at most 1,000 Å, preferably at most 800 Å and at least 100 Å.

The latex having an average particle size within the range mentioned above can be used without particular problem under the conventionally adopted conditions mentioned above.

The polymer particles are separated from the polymer latex as prepared in the above manner by salting out or coagulating the latex by addition of a usual electrolyte, or separated by spray-drying the latex in hot air.

The resulting two-stage polymer may be, if required, subjected to treatments such as washing, dehydration and drying in a conventional manner.

Preferably the obtained processing aid is usually in the form of a white powder having an average particle size of 30 to 300 μm.

The specific viscosity measured at 30° C. as to a solution of 0.4 g of the processing aid used in the present invention in 100 ml of benzene is at least 1, preferably at least 1.2, more preferably at least 1.5, and preferably it is at most 7, especially at most 5, more especially at most 3. If the specific viscosity is less than 1, sufficient processability is not obtained. If the specific viscosity is more than 7, the transparency tends to deteriorate.

In the case of conventional processing aids, if the specific viscosity measured at 30° C. as to the solution of 0.4 g of the processing aid in 100 ml of benzene is more than 1, problems arise when added to a vinyl chloride resin, e.g., deterioration of gelation property of the vinyl chloride resin, and deterioration of processability such as elongation at high temperatures and foamability. In contrast, the processing aid of the present invention, even though the molecular weight thereof is so high as to show a specific viscosity of at least 1, can give sufficient gelation property and processability and can sufficiently exert a high performance that a high molecular weight processing aid originally possesses.

The vinyl chloride resin composition of the present invention can be obtained by incorporating the above-mentioned processing aid to a vinyl chloride resin as mentioned above in a conventional manner.

The amount of the processing aid is from 0.1 to 30 parts by weight, preferably 0.3 to 10 parts by weight, more preferably 0.5 to 5 parts by weight, per 100 parts by weight of a vinyl chloride resin. If the amount of the processing aid is less than 0.1 part by weight, the effect of adding the processing aid is not obtained sufficiently. If the amount of the processing aid is more than 30 parts by weight, excellent mechanical property of a vinyl chloride resin is impaired.

The vinyl chloride resin composition of the present invention may contain various additives such as a stabilizer, a lubricant, an impact modifier, a plasticizer, a coloring agent, a filler and a foaming agent, as occasion demands.

The vinyl chloride resin composition of the present invention is excellent in the processability and can be molded by various methods such as blow molding, injection molding, calender molding and extrusion molding. The obtained molded articles are excellent in appearance such as transparency, gloss and surface smoothness and in secondary processability. Additionally, the vinyl chloride resin composition has an excellent property such that when foamed, molded foams having a low specific gravity can be obtained. Accordingly, the vinyl chloride resin composition can be favorably used in all the fields where the processing of vinyl chloride resins is required, for example, in the production of sheets, pipes, moldings of complicated shapes, molded foams and the like.

The present invention is more specifically described and explained by means of the following Examples and Comparative Examples in which all % and parts are by weight unless otherwise noted. It is to be understood that the present invention is not limited to these Examples.

In the Examples and Comparative Examples, the measurement and evaluation were made according to the following conditions and methods.

(Average Particle Size)

The average particle size of a latex was measured by a turbidity method.

(Specific Viscosity $\eta_{sp}$)

In 100 ml of benzene was dissolved 0.4 g of a polymer sample, and the specific viscosity $\eta_{sp}$ of the resulting solution was measured by means of a Ubbelohde viscometer maintained at a constant temperature in a water bath of 30° C.

The following properties were evaluated with respect to a vinyl chloride resin composition prepared by incorporating 100 parts of polyvinyl chloride having an average degree of polymerization of 660 with 3 parts of a polymer sample as a processing aid, 1.5 parts of an octyl tin mercaptide stabilizer, 1.5 parts of epoxidized soybean oil, 1.0 part of butyl stearate and 0.5 part of polyethylene glycol fatty acid ester.

(Gelation Property)

Fifty-five grams of the vinyl chloride resin composition was kneaded at 150° C. by a small-sized kneading tester (trade mark "Plasticorder" PLE-331, product of BRABENDER OHG) to obtain a kneading time-torque curve. The gelation property was evaluated from the degree of inclination of the straight line which connected the points of the minimum torque and the maximum torque. It was judged that the larger the degree of inclination, the better the gelation property.

(Transparency)

The vinyl chloride resin composition was kneaded by means of 8-inch test rolls at 160° C. for 5 minutes and then press-molded at 170° C. for 15 minutes to give a plate having a thickness of 5 mm. The total light transmission and haze of the obtained plate were measured according to JIS K 6714 to estimate the transparency. The higher the value of total light transmission, the better the transparency. The lower the value of haze, the better the transparency.

(Processability)

The vinyl chloride resin composition was kneaded by means of 8-inch test rolls at 160° C. for 5 minutes and, then, press-molded at 170° C. for 15 minutes to give a plate having a thickness of 1 mm. Using the obtained plate, the elongation at high temperatures was measured according to JIS K 7113 to evaluate the processability. The measurement was made by using Dumbbell No. 2 test specimens according to JIS at 100° C. at a tensile speed of 200 mm/min. The higher the value of elongation, the better the processing aid.

For evaluating the foamability of the vinyl chloride resin composition, the vinyl chloride resin composition was further incorporated with 0.6 part of azodicarboneamide per 100 parts of polyvinyl chloride and mixture was molded at 170° C. by a small-sized extruder (2D20C made by Toyo Seiki Kabushiki Kaisha) to give a rectangular cellular molded article. The specific gravity of the obtained foam was measured. The lower the value of the specific gravity of the foam, the better the foamability of the vinyl chloride resin composition.

The abbreviations described hereinafter denote the following compounds.

MMA: Methyl methacrylate
BA: Butyl acrylate
EA: Ethyl acrylate
BMA: Butyl methacrylate
AN: Acrylonitrile

EXAMPLE 1

An 8-liter reactor equipped with a stirrer was charged with 0.8 part of sodium dioctyl sulfosuccinate (emulsifier) and 0.05 part of potassium persulfate (polymerization initiator) which were previously dissolved in water, and thereto was further added water so that the total amount of water became 200 parts. Oxygen in the space of the reactor and in water was removed by introducing nitrogen gas into the reactor and, then, the content therein was heated to 70° C. with stirring. To the reactor was then added dropwise a monomer mixture (A) of 3 parts of methyl methacrylate (MMA) and 7 parts of butyl acrylate (BA) at a rate of about 20 parts per hour. After the completion of the addition, the stirring was further continued for one hour to complete the polymerization substantially. Then, thereto was added dropwise a monomer mixture (B) of 72 parts of MMA and 18 parts of butyl methacrylate (BMA) at a rate of about 20 parts per hour. After the completion of the addition, the content was kept at 70° C. for 90 minutes and, then, cooled to give a latex. The polymerization conversion was 99.5%. The average particle size of polymer particles in the latex was 1,200 Å.

The obtained latex was coagulated with an aqueous solution of calcium chloride, heat-treated by raising the temperature up to 900C, and dehydrated by means of a centrifugal dehydrator to give a dehydrated cake of a polymer. The dehydrated cake was washed with water in an amount almost the same weight as that of the polymer and, then, dried at 50° C. for 15 hours by a concurrent flow drier to give a polymer sample (1) in the form of a white powder.

The polymer sample (1) was estimated in the manner described before. The results are shown in Table 1.

EXAMPLES 2 TO 4 AND COMPARATIVE EXAMPLES 1 TO 3

Polymer samples (2) to (7) were prepared in the same manner as in Example 1 using the components and amounts shown in Table 1. The polymer sample (5) of Comparative Example 1 was a one-stage polymer wherein the polymerization of monomer mixture (A) was not made, but it was obtained in substantially the same manner as in Example 1. The average particle size of polymer particles in all the obtained latexes was within a range of 1,100 to 1,300 Å.

The obtained polymer samples and vinyl chloride resin compositions prepared using them were estimated. The results are shown in Table 1.

TABLE 1

|  | Ex. 1 | Ex. 2 | Ex. 3 | Ex. 4 | Com. Ex. 1 | Com. Ex. 2 | Com. Ex. 3 |
|---|---|---|---|---|---|---|---|
| Polymer sample (Processing aid) | (1) | (2) | (3) | (4) | (5) | (6) | (7) |
| Monomer (part) | | | | | | | |
| Monomer mixture (A) | | | | | | | |
| MMA | 3 | 0 | 4 | 3 | — | 0.5 | 10 |
| BA | 7 | 10 | 18 | — | — | 1 | 25 |
| EA | — | — | — | 7 | — | — | — |
| Monomer mixture (B) | | | | | | | |
| MMA | 72 | 72 | 63 | 72 | 80 | 79 | 52 |
| BMA | 18 | 18 | 15 | 18 | 20 | 19.5 | 13 |
| Specific viscosity $\eta_{sp}$ | 1.4 | 1.5 | 1.3 | 1.5 | 1.6 | 1.5 | 1.3 |
| Gelation property (Nm/sec.) | 0.50 | 0.47 | 0.48 | 0.48 | 0.22 | 0.29 | 0.47 |
| Transparency | | | | | | | |
| Total light transmission (%) | 73.1 | 72.3 | 70.5 | 73.3 | 61.4 | 67.2 | 60.5 |
| Haze (%) | 12.5 | 13.4 | 15.0 | 12.6 | 20.0 | 18.3 | 23.1 |
| Processability | | | | | | | |
| Elongation at high temperatures (%) | 700 | 680 | 650 | 670 | 400 | 510 | 580 |
| Foamability (g/cm$^3$) | 0.63 | 0.65 | 0.60 | 0.64 | 0.84 | 0.78 | 0.74 |

From the results shown in Table 1, it is found that when using the polymer samples (1) to (4) which were prepared by polymerizing a monomer mixture containing a major amount of methyl methacrylate in the presence of a copolymer latex prepared by emulsion-polymerizing a monomer mixture containing a major amount of an alkyl acrylate, the obtained vinyl chloride resin compositions are excellent in gelation property and processability as compared to the polymer sample (5) which is a one-stage polymer. When the amount of the monomer mixture (A) is too small as in the polymer sample (6), a sufficient gelation property is not given. In contrast, when the amount of the monomer mixture (A) is too large as in the polymer sample (7), the processability and transparency of the obtained resin composition are deteriorated though the gelation property is satisfactory.

EXAMPLES 5 TO 10 AND COMPARATIVE EXAMPLES 4 TO 6

Polymer samples (8) to (16) were prepared in the same manner as in Example 1 using the components and amounts shown in Table 2. The average particle size of polymer particles in all the obtained latexes was within the range of 1,000 to 1,300 Å.

The results of evaluation of these samples are shown in Table 2.

10%, a gelation property deteriorates and the other physical properties also deteriorate.

TABLE 2

|  | Ex. 1 | Ex. 5 | Ex. 6 | Ex. 7 | Ex. 8 | Ex. 9 | Ex. 10 | Com. Ex. 4 | Com. Ex. 5 | Com. Ex. 6 |
|---|---|---|---|---|---|---|---|---|---|---|
| Polymer sample (Processing aid) | (1) | (8) | (9) | (10) | (11) | (12) | (13) | (14) | (15) | (16) |
| Monomer (part) | | | | | | | | | | |
| Monomer mixture (A) | | | | | | | | | | |
| MMA | 3 | 3 | 3 | 3 | 3 | 3 | 3 | 3 | 3 | 3 |
| BA | 7 | 7 | 7 | 7 | 7 | 7 | 7 | 7 | 7 | 7 |
| Monomer mixture (B) | | | | | | | | | | |
| MMA | 72 | 90 | 63 | 72 | 63 | 72 | 72 | 45 | 45 | 70 |
| BMA | 18 | — | 27 | — | — | — | 15 | 45 | — | 5 |
| BA | — | — | — | 18 | 27 | — | — | — | 45 | — |
| EA | — | — | — | — | — | 18 | — | — | — | — |
| AN | — | — | — | — | — | — | 3 | — | — | 15 |
| Specific viscosity $\eta_{sp}$ | 1.4 | 1.6 | 1.3 | 1.5 | 1.4 | 1.4 | 1.4 | 1.3 | 1.3 | 1.4 |
| Gelation property (Nm/sec.) | 0.50 | 0.55 | 0.48 | 0.47 | 0.47 | 0.52 | 0.49 | 0.45 | 0.43 | 0.32 |
| Transparency | | | | | | | | | | |
| Total light transmission (%) | 73.1 | 71.8 | 71.2 | 70.1 | 71.5 | 72.5 | 71.5 | 58.5 | 60.8 | 63.5 |
| Haze (%) | 12.5 | 15.5 | 15.4 | 16.5 | 15.4 | 13.3 | 14.3 | 23.0 | 21.5 | 19.3 |
| Processability | | | | | | | | | | |
| Elongation at high temperatures (%) | 700 | 650 | 660 | 650 | 670 | 660 | 650 | 490 | 500 | 510 |
| Foamability (g/cm$^3$) | 0.63 | 0.67 | 0.64 | 0.66 | 0.65 | 0.65 | 0.66 | 0.67 | 0.67 | 0.85 |

From the results shown in Table 2, it is found that, in the case of using the polymer samples (8) to (13), a vinyl chloride resin composition having excellent gelation property, transparency and processability can be obtained whereas the transparency and processability are worse in the case of using the polymer samples (14) and (15) prepared using the monomer mixture (B) which contains an alkyl methacrylate other than methyl methacrylate or an alkyl acrylate in a too large amount. When a small amount of a monomer (acrylonitrile) other than an alkyl methacrylate and an alkyl acrylate is copolymerized as in the polymer sample (13), deterioration of physical properties is not caused. However, when the content of the monomer (acrylonitrile) other than an alkyl methacrylate and an alkyl acrylate is larger than the claimed range, i.e., more than

EXAMPLES 11 AND 12 AND COMPARATIVE EXAMPLES 7 TO 10

Polymer samples (17) to (22) were prepared in the same manner as in Example 1 except that the amounts of the polymerization initiator (potassium persulfate) and the emulsifier (sodium dioctyl sulfosuccinate) were varied to change the specific viscosity $\eta_{sp}$ and the average particle size of polymer particles in latex.

Using each of the obtained polymer samples, vinyl chloride resin compositions were prepared and the transparency and process ability thereof were examined. The results are shown in Table 3.

TABLE 3

|  | Ex. 1 | Ex. 11 | Ex. 12 | Com. Ex. 7 | Com. Ex. 8 | Com. Ex. 9 | Com. Ex. 1 | Com. Ex. 10 |
|---|---|---|---|---|---|---|---|---|
| Polymer sample (Processing aid) | (1) | (17) | (18) | (19) | (20) | (21) | (5) | (22) |
| Ingredients (part) | | | | | | | | |
| Monomer mixture (A) | | | | | | | | |
| MMA | 3 | 3 | 3 | 3 | 3 | — | — | — |
| BA | 7 | 7 | 7 | 7 | 7 | — | — | — |
| Monomer mixture (B) | | | | | | | | |
| MMA | 72 | 72 | 72 | 72 | 72 | 80 | 80 | 80 |
| BMA | 18 | 18 | 18 | 18 | 18 | 20 | 20 | 20 |
| Initiator | 0.05 | 0.03 | 0.01 | 0.2 | 0.1 | 0.1 | 0.05 | 0.01 |
| Emulsifier | 0.8 | 1.2 | 1.6 | 0.5 | 0.5 | 0.5 | 0.8 | 1.6 |
| Specific viscosity $\eta_{sp}$ | 1.4 | 2.3 | 2.8 | 0.5 | 0.8 | 0.8 | 1.6 | 3.0 |
| Average particle size (Å) | 1200 | 1200 | 1300 | 1000 | 1200 | 1300 | 1300 | 1300 |
| Transparency | | | | | | | | |
| Total light transmission (%) | 73.1 | 70.5 | 68.9 | 74.1 | 73.8 | 65.3 | 61.4 | 55.4 |
| Haze (%) | 12.5 | 13.8 | 16.2 | 11.6 | 11.4 | 24.3 | 25.0 | 32.0 |

TABLE 3-continued

|  | Ex. 1 | Ex. 11 | Ex. 12 | Com. Ex. 7 | Com. Ex. 8 | Com. Ex. 9 | Com. Ex. 1 | Com. Ex. 10 |
|---|---|---|---|---|---|---|---|---|
| Processability |  |  |  |  |  |  |  |  |
| Elongation at high temperatures (%) | 700 | 810 | 830 | 220 | 390 | 330 | 350 | 380 |
| Foamability (g/cm$^3$) | 0.63 | 0.54 | 0.49 | 0.98 | 0.90 | 0.93 | 0.84 | 0.81 |

From the results shown in Table 3, it is understood that in the case of using the polymer samples (19), (20) and (21) having a specific viscosity $\eta_{sp}$ of less than 1, no sufficient processability is obtained and, therefore, the specific viscosity $\eta_{sp}$ of a processing aid should be at least 1.0.

In the case of using the polymer samples (17) and (18), even if the specific viscosity $\eta_{sp}$ is raised, the transparency is scarcely deteriorated and the processability is rather enhanced. In contrast, in the case of using the polymer samples (5) and (22) prepared using no monomer mixture (A), if the specific viscosity $\eta_{sp}$ is raised, the transparency is deteriorated remarkably and the processability is still insufficient.

EXAMPLES 13 AND 14 AND REFERENCE EXAMPLES 1 AND 2

Polymer samples (23) and (24) were prepared in the same manner as in Example 1 except that the amounts of the polymerization initiator (potassium persulfate) and the emulsifier (sodium dioctyl sulfosuccinate) were varied to change the specific viscosity $\eta_{sp}$ and the average particle size of polymer particles in latex.

Using each of the obtained polymer samples, vinyl chloride resin compositions were prepared and evaluated, provided that, in the evalvation of the transparency and processability, the temperature of 8-inch rolls for kneading the compositions was changed to 150° C. and the press-molding temperature was changed to 160° C. and, in the evaluation of the foamability, the temperature of the extruder was changed to 160° C.

The results are shown in Table 4.

TABLE 4

|  | Ex. 13 | Ex. 14 | Ref. Ex. 1 | Ref. Ex.2 |
|---|---|---|---|---|
| Polymer sample (Processing aid) | (23) | (24) | (1) | (17) |
| Ingredients (part) |  |  |  |  |
| Monomer mixture (A) |  |  |  |  |
| MMA | 3 | 3 | 3 | 3 |
| BA | 7 | 7 | 7 | 7 |
| Monomer mixture (B) |  |  |  |  |
| MMA | 72 | 72 | 72 | 72 |
| BMA | 18 | 18 | 18 | 18 |
| Initiator | 0.05 | 0.03 | 0.05 | 0.03 |
| Emulsifier | 1.8 | 2.2 | 0.8 | 1.2 |
| Specific viscosity $\eta_{sp}$ | 1.5 | 2.2 | 1.4 | 2.3 |
| Average particle size (Å) | 800 | 800 | 1200 | 1200 |
| Transparency |  |  |  |  |
| Total light transmission (%) | 68.5 | 68.1 | 63.2 | 57.1 |
| Haze (%) | 20.3 | 21.3 | 26.3 | 31.1 |

TABLE 4-continued

|  | Ex. 13 | Ex. 14 | Ref. Ex. 1 | Ref. Ex.2 |
|---|---|---|---|---|
| Processability |  |  |  |  |
| Elongation at high temperatures (%) | 510 | 550 | 290 | 210 |
| Foamability (g/cm$^3$) | 0.68 | 0.63 | 0.83 | 0.73 |

In Reference Examples 1 and 2, the same polymer samples as used in Examples 1 and 11 were used, respectively, but the processing conditions of vinyl chloride resin composition were changed as described above. From the results of Reference Examples 1 and 2, it is found that a polymer sample having a higher specific viscosity $\eta_{sp}$ shows lower transparency and processability, when the processing temperature, namely each of the roll temperature, press-molding temperature and foaming temperature, is lowered by 10° C. On the other hand, in Examples 13 and 14 wherein the polymer samples (23) and (24) having an average particle size of latex of at most 1,000 Å are used, the transparency does not deteriorate and the processability is rather enhanced under such a processing condition, even if the specific viscosity $\eta_{sp}$ of the polymer sample is raised. The effects of using a processing aid the average particle size of latex of which is at most 1,000 Å are understood from these results.

EXAMPLES 15 AND 16 AND COMPARATIVE EXAMPLES 11 AND 12

In order to evaluate the influence of changing the amount of the polymer sample (1) in the vinyl chloride resin composition of Example 1, vinyl chloride resin compositions were prepared in the same a manner as in Example 1 except that the amount of the polymer sample (1) was changed from 3 parts to the amounts shown in Table 5.

The results are shown in Table 5.

TABLE 5

|  | Ex. 1 | Ex.15 | Ex. 16 | Com. Ex. 11 | Com. Ex. 12 |
|---|---|---|---|---|---|
| Polymer sample (Processing aid) | (1) | (1) | (1) | (1) | (1) |
| Amount of polymer sample (part) | 3 | 0.5 | 15 | 0.01 | 40 |
| Gelation property (Nm/sec.) | 0.50 | 0.41 | 0.89 | 0.15 | 1 |
| Transparency |  |  |  |  |  |
| Total light transmission (%) | 73.1 | 72.1 | 68.3 | 66.5 | — |
| Haze (%) | 12.5 | 11.8 | 16.1 | 19.5 | — |

TABLE 5-continued

|  | Ex. 1 | Ex.15 | Ex. 16 | Com. Ex. 11 | Com. Ex. 12 |
|---|---|---|---|---|---|
| Processability | | | | | |
| Elongation at high temperatures (%) | 700 | 620 | 800 | 150 | — |
| Foamability (g/cm$^3$) | 0.63 | 0.7 | 0.60 | 1.15 | — |

As shown in Table 5, the vinyl chloride resin compositions containing the polymer sample (1) in amounts within the claimed range have excellent gelation property, transparency and processability. However, in the case of containing the polymer sample (1) in a smaller amount than the claimed range as in Comparative Example 11, sufficient gelation property and processability are not obtained. In the case of containing the polymer sample (1) in a larger amount than the claimed range as in Comparative Example 12, a molded article suitable for evaluating the transparency and processability could not be obtained because of losing homogeneity.

In addition to the ingredients used in the Examples, other ingredients can be used in the Examples as set forth in the specification to obtain substantially the same results.

What we claim is:

1. A vinyl chloride resin composition comprising a vinyl chloride resin and 0.1 to 30 parts by weight of a processing aid per 100 parts by weight of said vinyl chloride resin, wherein said processing aid is a polymer prepared by polymerizing (B) 70 to 97 parts by weight of a monomer mixture comprising 60 to 100% by weight of methyl methacrylate, 0 to 40% by weight of at least one monomer selected from the group consisting of an alkyl acrylate and an alkyl methacrylate different from methyl methacrylate and 0 to 10% by weight of other vinyl monomer copolymerizable therewith, in the presence of a latex prepared by emulsion-polymerizing (A) 3 to 30 parts by weight of a monomer mixture comprising 0 to 45% by weight of methyl methacrylate, 55 to 100% by weight of an alkyl acrylate and 0 to 20% by weight of other vinyl monomer copolymerizable therewith, the total amount of said mixtures (A) and (B) being 100 parts by weight, and said polymer has a specific viscosity of at least 1 measured at 30° C. with respect to a solution of 0.4 g of said polymer in 100 ml of benzene.

2. The composition of claim 1, wherein said polymer used as the processing aid has an average particle size of at most 1,000 Å in the form of an aqueous latex.

3. The composition of claim 1, wherein said vinyl chloride resin is a polymer consisting of 80 to 100% by weight of units of vinyl chloride and 20 to 0% by weight of units of other monomers copolymerizable with vinyl chloride.

4. The composition of claim 1, wherein said monomer mixture (A) consists of 20 to 45% by weight of methyl methacrylate, 80 to 55% by weight of an alkyl acrylate and 0 to 20% by weight of other vinyl monomer copolymerizable therewith.

5. The composition of claim 1, wherein said alkyl acrylate in the monomer mixture (A) is an alkyl acrylate having a $C_1$ to $C_8$ alkyl group.

6. The composition of claim 1, wherein said alkyl acrylate in the monomer mixture (A) is ethyl acrylate, butyl acrylate or a mixture thereof.

7. The composition of claim 1, wherein said monomer mixture (B) consists of 60 to 90% by weight of methyl methacrylate, 40 to 10% by weight of at least one monomer selected from the group consisting of an alkyl acrylate and an alkyl methacrylate different from methyl methacrylate, and 0 to 10% by weight of other vinyl monomer copolymerizable therewith.

8. The composition of claim 1, wherein said polymer as the processing aid has a specified viscosity of at least 1.2 measured at 30° C. with respect to a solution of 0.4 g of said polymer in 100 ml of benzene.

* * * * *